(12) United States Patent
Aizawa

(10) Patent No.: US 8,880,870 B2
(45) Date of Patent: Nov. 4, 2014

(54) BRIDGING SYSTEM, BRIDGE, AND BRIDGING METHOD

(75) Inventor: Kazumasa Aizawa, Ageo (JP)

(73) Assignee: Meidensha Corporation, Tokyo (JP)

( * ) Notice: Subject to any disclaimer, the term of this patent is extended or adjusted under 35 U.S.C. 154(b) by 898 days.

(21) Appl. No.: 12/435,555

(22) Filed: May 5, 2009

(65) Prior Publication Data

US 2009/0271615 A1    Oct. 29, 2009

(30) Foreign Application Priority Data

May 16, 2008 (JP) .................................. 2008-128979

(51) Int. Cl.
| | |
|---|---|
| *H04L 29/06* | (2006.01) |
| *H04L 9/08* | (2006.01) |
| *H04L 12/46* | (2006.01) |
| *H04L 9/32* | (2006.01) |

(52) U.S. Cl.
CPC ................ *H04L 63/08* (2013.01); *H04L 9/083* (2013.01); *H04L 12/4625* (2013.01); *H04L 2209/80* (2013.01); *H04L 63/06* (2013.01); *H04L 9/3231* (2013.01); *H04L 9/3273* (2013.01); *H04L 63/0428* (2013.01)
USPC .......................................................... 713/153

(58) Field of Classification Search
CPC ...................................................... H04L 63/08
USPC ........................................................... 713/153
See application file for complete search history.

(56) References Cited

U.S. PATENT DOCUMENTS

| | | | | |
|---|---|---|---|---|
| 5,832,503 A | * | 11/1998 | Malik et al. | 709/223 |
| 5,930,257 A | * | 7/1999 | Smith et al. | 370/401 |
| 6,157,635 A | * | 12/2000 | Wang et al. | 370/352 |

(Continued)

FOREIGN PATENT DOCUMENTS

| | | |
|---|---|---|
| JP | 2003-337923 A | 11/2003 |
| JP | 2005-524341 A | 8/2005 |

(Continued)

OTHER PUBLICATIONS

Schneier, Applied Crytpography, 1996, pp. 47-52.*

(Continued)

*Primary Examiner* — Bradley Holder
(74) *Attorney, Agent, or Firm* — Foley & Lardner LLP

(57) ABSTRACT

Bridges 30, 40 are interposed between a server 10 or a client 20 having two channels 2ch, one of the two channels making a LAN connection to either the server or the client and the other channel making the LAN connection to the internet. Each of bridges 30, 40 performs a LAN packet scramble, a scramble purpose encryption key management, a scramble purpose encryption key management, and a bridging system authentication. Furthermore, each of bridges 30, 40 performs a LAN packet scramble, a scramble purpose encryption key management, and a bridging system authentication for a packet derived from the server or the client. Furthermore, a composite authentication having a plurality of authentication purpose interfaces is carried out in each of the bridges. Furthermore, a composite authentication having a plurality of authentication purpose interfaces is carried out in each of the bridges. The bridge has a plurality of authentication purpose interfaces to perform a composite authentication. Each of the bridges performs a key management to manage and hold the common key in the authentication and performs a non-decryption file management which manages and holds a file information encrypting and transmitting a payload of an application communicated with a common key at an internal of a transmission side bridge.

13 Claims, 16 Drawing Sheets

FUNCTIONAL STRUCTURE OF BRIDGE

(56) References Cited

U.S. PATENT DOCUMENTS

| | | | |
|---|---|---|---|
| 6,728,672 B1* | 4/2004 | Will | 704/233 |
| 7,266,695 B2 | 9/2007 | Nakayama | |
| 7,539,858 B2 | 5/2009 | Karasawa et al. | |
| 7,818,790 B1* | 10/2010 | Burns et al. | 726/7 |
| 2002/0052968 A1* | 5/2002 | Bonefas et al. | 709/231 |
| 2002/0154644 A1* | 10/2002 | Lindemann et al. | 370/401 |
| 2003/0093563 A1* | 5/2003 | Young et al. | 709/245 |
| 2003/0105830 A1* | 6/2003 | Pham et al. | 709/216 |
| 2003/0172278 A1* | 9/2003 | Farnham et al. | 713/176 |
| 2004/0015610 A1* | 1/2004 | Treadwell | 709/246 |
| 2004/0017770 A1* | 1/2004 | Higashiyama et al. | 370/223 |
| 2004/0174826 A1* | 9/2004 | Popovich et al. | 370/254 |
| 2005/0021949 A1* | 1/2005 | Izawa et al. | 713/165 |
| 2005/0100029 A1* | 5/2005 | Das | 370/401 |
| 2006/0268834 A1* | 11/2006 | Bajic | 370/352 |
| 2009/0119206 A1* | 5/2009 | Minor | 705/40 |

FOREIGN PATENT DOCUMENTS

| | | |
|---|---|---|
| JP | 2006-217551 A | 8/2006 |
| JP | 2007-49411 A | 2/2007 |
| JP | 2007-280083 A | 10/2007 |
| WO | WO 03/094438 A1 | 11/2003 |
| WO | WO 2005/099170 A1 | 10/2005 |

OTHER PUBLICATIONS

Deering; Multicast routing in internetworks and extended LANs; Proceeding SIGCOMM '88 Symposium proceedings on Communications architectures and protocols; pp. 55-64; ACM New York, NY, USA 1988; ACM Digital Library.*

Garcia et al.; A new transparent bridge protocol for LAN internetworking using topologies with active loops; Published in: Parallel Processing, 1998. Proceedings. 1998 International Conference on; Date of Conference: Aug. 10-14, 1998; pp. 295-303; IEEE Xplore.*

* cited by examiner

FUNCTIONAL STRUCTURE OF BRIDGE

RELATIONSHIP DIAGRAM BETWEEN BRIDGE FUNCTION

STRUCTURE OF BRIDGE FUNCTIONS

SPECIFIC EXAMPLE OF SCRAMBLE & BRIDGING GATEWAY FUNCTIONS

RELATIONSHIP VIEW BETWEEN FUNCTIONS OF A CONCEALMENT/SAVE MECHANISM EQUIPPED BRIDGE

CONFIGURATION VIEW OF CONCEALMENT/SAVE MECHANISM

SPECIFIC EXAMPLE OF SCRAMBLE & BRIDGING GATEWAY FUNCTIONS

BRIDGING SYSTEM, BRIDGE, AND BRIDGING METHOD

TECHNICAL FIELD

The present invention relates to bridging system, bridge, and bridging method for performing an encryption communication between a server and a client via an internet.

BACKGROUND ART

A technique through a PPP tunneling (a communication between different communication protocols) dedicated to a wireless communication has been proposed as an encryption communication system between the server and the client via the internet (for example, refer to a Patent Document 1).

This communication system performs a layer-2 encryption mechanism for protecting a path between a terminal equipment and a mobile network and performs a user oriented SIM (IC card) based authentication to access a WLAN (Wireless LAN) for which an IP connectivity is provided.

In this document, an AKA dialogue PPP tunneling between access controllers to access the mobile communication network carrying terminals and the SIM is established. For the same purpose, each of the terminals includes: a PPPoE server (Point-to-Point over Ethernet: registered trade mark) for performing a tunneling of the AKA dialogue from a PPP client installed within each of the terminals and further includes a traffic router and a RADIUS-client. An AC including a RADIUS-client is disposed between the mobile networks in which a RADIUS proxy and SIM based authentication are performed for which an Access Point (AP) within the WLAN is carried out.

[Patent Document 1] a Japanese PCT Application Translation Publication (Tokkouhyo) No. JP2005-524341.

DISCLOSURE OF THE INVENTION

Above-described Patent Document 1 describes the PPP tunneling dedicated to the wireless communication. Regardless of the wire and wireless communications, a bridging system which performs the encryption communication using the Ethernet (registered trade mark) has not been proposed.

In addition, Patent Document 1 describes the SIM (IC card) based authentication. A user cannot always identify an owner himself. Furthermore, there is a possibility that, when a built-in device (for example, a portable telephone) is lost or squeezed, the built-in device is abused. In other words, an easy spoofing for the built-in device can be carried out and is, therefore, vulnerable.

In addition, this Patent Document describes that a security communication is restricted to PPP, namely, layer-2. The PPP protocol is also actually mounted on the Ethernet in a case of PPPoE. A PPPserver for the authentication, RADIUS server for the authentication, as will be described below, and so forth are essentially needed for user-and-password authentication and RADIUS authentication. For these servers, authentication purpose account registration, modification, and erasure are needed in terms of the managements therefor.

A system for assuring a communication security includes a firewall. This firewall is a defense against an illegal intrusion when the LAN and the internet are connected and, functionally, a communication segment is divided into a DMZ, LAN, and WAN. The packet is monitored and controlled. However, the firewall has no function of a packet authentication and of a packet encryption.

Next, an SSL has been prepared for a security communication function. This is under a server authentication in a public key method in terms of its function and its communication is encrypted in a common key. This is applied to a PKI (Public Key Infrastructure). An actual mount thereof is in an intermediate position between a transport layer and an application layer. Hence, to cope with the SSL, the rebuilding of the application is compelled to be rebuilt.

Furthermore, an IPSec (an IP level encryption function) has been prepared as the security communication function. This principal functions are an IP datagram authentication and its encryption. A VPN router functions as an IPSec gateway and equipped at an edge of LAN (an entrance or an exit). A safety tunneling among remote LANs is performed by the IPSec through the authentication and the encryption.

It should, however, be noted that the communications in an internal of LAN is out of a category of a guard. Means for actually mounting the terminal at a driver level is provided. At this time, the security at an end-end is increased. However, a variety of OSs and a difference in versions are present in each of the terminals. A considerably high-level technology, thus, becomes necessary. The actual mount of a driver to be applied to these environments also requires a software development and its technical level thereof is increased.

It is, hence, an object of the present invention to provide bridging system, bridge, and bridging method which can solve each of tasks described above and can, particularly, strengthen an authentication aspect with less addition and rebuilding of communication devices.

To solve the above-described problem, according to the present invention, a bridge in which two channels of a channel configured to make a LAN connection to either a server or a client and the other channel configured to make a LAN connection to an internet are equipped is interposed between the server or the client and the internet, the bridge performs a LAN packet scramble, a scramble purpose encryption key management, and a bridging system authentication for a packet from the server or the client according to a key exchange mechanism, an encryption mechanism, and an authentication information addition, furthermore, has a plurality of authentication purpose interfaces to perform a composite authentication, and performs a key management for managing and holding a common key in this authentication and a non-decryption file management for managing and holding a file information of encrypting and transmitting a payload of an application communicated with the common key into an internal of a transmission side bridge. Features of the following system, bridge, and method are provided.

(Invention of System)

(1) A bridging system for performing an encryption communication between a server and a client via a LAN, comprising: a bridge in which one of two channels which makes a LAN connection to either the server or the client and the other channel thereof which makes the LAN connection to an internet are equipped and via which the server and the client are connected to the internet; and means, provided in the bridge, for performing a LAN packet scramble and a scramble purpose encryption key management for a packet from either the server or the client through a key exchange mechanism, an encryption mechanism, and an authentication information addition.

(2) The bridge is either a wire connection bridge configured to perform the encryption communication for the internet via a network equipment or a wireless connection bridge configured to be connected to an access point at the internet wirelessly to perform the encryption communication.

(3) The bridge performs a direct forwarding for a network address of the packet transmission side to a packet scramble & bridging gateway.

(4) The bridge is provided with a composite authentication management mechanism provided with a plurality of authentication interfaces to perform a composite authentication.

(5) The composite authentication management mechanism recognizes an individual authentication device and a biometrics authentication device via a device reader and reads an authentication data and the individual authentication device performs a unique management using a system ID.

(6) The bridge is provided with the composite authentication management mechanism and a concealment/save mechanism and the composite authentication management mechanism is provided with means for performing a mutual authentication with an opposing bridge including an On/Off state of the concealment/save mechanism, for performing an automatic key exchange, and for determining a common key and wherein the concealment/save mechanism includes: key management means for managing and saving the common key in the On state of the concealment/save mechanism after the communication and non-decryption file management means for encrypting and transmitting a payload of an application communicated with the common key at an internal of the transmission side bridge.

(Invention of Bridge)

(7) A bridge for performing a bridging to perform an encryption communication between a server and a client via a LAN, the bridge comprising: two channels, one of the channels making a LAN connection to either the server or the client and the other channel making a LAN connection to an internet; and means for performing a LAN packet scramble and an encryption key management and performing a bridging system authentication for the packet from either the server or the client by a key exchange mechanism, an encryption mechanism, and an authentication information addition.

(8) The bridge performs the direct forwarding for the network address at a packet transmission side to a scramble & bridging gateway of the packet.

(9) The bridge performs the direct forwarding for the network address at the packet transmission side to the scramble & bridging gateway of the packet.

(10) The bridge performs the direct forwarding for the network address at the packet transmission side to the scramble & bridging gateway of the packet.

(11) The composite authentication management mechanism recognizes an individual recognition purpose device and a biometrics authentication purpose device via a device reader and reads an authentication purpose data and the individual authentication purpose device performs a unique management using a system ID.

(12) The bridge includes: the composite authentication management mechanism; and a concealment/save mechanism and wherein the bridge further includes means for performing a mutual authentication by means of the composite authentication management mechanism including an On/Off state of the concealment/save mechanism with an opposing bridge, for performing an automatic key management, and for determining a common key and wherein the concealment/save mechanism further includes: key management means for managing and holding the common key even after the communication when the concealment/save mechanism is in an On state; and non-decryption file management means for managing and holding a file information encrypting and transmitting a payload of an application communicated with the common key at an internal of a transmission side bridge.

(Invention of System)

(13) A bridging method for performing an encryption communication between a server and a client via a LAN, the bridging method comprising: connecting an internet via a bridge in which two channels are equipped, one of the two channels making a LAN connection to either the server or the client and the other channel making a LAN connection to an internet and wherein the bridge is provided with a composite authentication management procedure to perform a LAN packet scramble, a scramble purpose encryption key management, and a bridging system authentication for a packet from either the server or the client.

(14) The bridge is either a wire connection bridge for performing an encryption communication with the internet via wire connection network equipment or a wireless connection bridge for performing the encryption communication with an access point at the internet wirelessly.

(15) The bridge is provided with a procedure to perform a direct forwarding for a network address at the packet transmission side to a scramble & bridging gateway.

(16) The bridge is provided with a procedure to perform a direct forwarding of a network address at the packet transmission side to a packet scramble & bridging gateway.

(17) The composite authentication management procedure recognizes an individual authentication purpose device and a biometrics authentication purpose device via a device reader and reads an authentication purpose data, and the individual authentication purpose device is provided with a procedure for performing a unique management using a system ID.

(18) The bridge is provided with the composite authentication management mechanism and a concealment/save mechanism, the composite authentication management mechanism is provided with a procedure to perform a mutual authentication including an On/Off state of the concealment/save mechanism with an opposing bridge, to perform an automatic key exchange, and to determine a common key and the concealment/save mechanism is provided with a key management procedure to manage and hold the common key even after the communication when the concealment/save mechanism is in an On state and provided with a non-decryption file management procedure to manage and hold a file information encrypting and transmitting a payload of an application communicated with the common key at an internal of a transmission side bridge.

As described hereinabove, according to the present invention, a bridge in which two channels of a channel configured to make a LAN connection to either a server or a client and the other channel configured to make a LAN connection to an internet are equipped is interposed between the server or the client and the internet, the bridge performs a LAN packet scramble, a scramble purpose encryption key management, and a bridging system authentication for a packet from the server or the client according to a key exchange mechanism, an encryption mechanism, and an authentication information addition, furthermore, and has a plurality of authentication purpose interfaces to perform a composite authentication. Thus, the following advantages are achieved.

(1) It becomes possible to perform the encryption and the authentication without rebuild of the application.

(2) No server for the authentication is needed.

(3) Since the present invention is not dependent upon the IP address, an easy add-on to the network can be achieved.

(4) The present invention can provide the encryption infrastructure.

(5) The encryption infrastructure can be achieved.

(6) Even if the ID card is lost and stolen, the present invention has the feature that the authentication is the composite authentication including the biometrics authentication. Hence, it cannot be validated by a person other than an owner thereof. Consequently, leakage and abuse can be defended.

(7) It is not necessary to remember a password of the ID card and the biometrics authentication is carried out. In order to make the ID card effective, a safety individual authentication is possible even in a young age or high age layer. Thus, the convenience is high.

(8) A rigid information confidentiality due to the composite authentication: It becomes possible to perform the encryption and authentication without rebuild of the application.

In addition, according to the present invention, the concealment/save mechanism is provided in addition to the composite authentication management mechanism in the bridge and, in the concealment/save mechanism, the key management function for managing and holding the common key and the non-decryption file management function for managing and holding the file information that the payload of the application communicated with the common key is encrypted and transmitted at the internal of the transmission side bridge. Thus, the following advantages are achieved.

(9) The data in the non-decryption form (in other words, still in the encryption form) is saved in the server and the key in the decipher is positioned at the transmission side bridge. An arbitrary decryption in the internal of the server side cannot be made and the safe communication can be achieved.

(10) Modification and rebuilding of the application are not needed at all.

(11) A minute network rebuilding permits a service of the concealment and saving.

(12) The achievements of the safety according to the composite authentication and the information concealment within the server provide a data protection infrastructure.

(13) The wireless security can be strengthened owing to the composite authentication.

BEST MODE FOR CARRYING OUT OF THE INVENTION

First Embodiment

Figure 1:
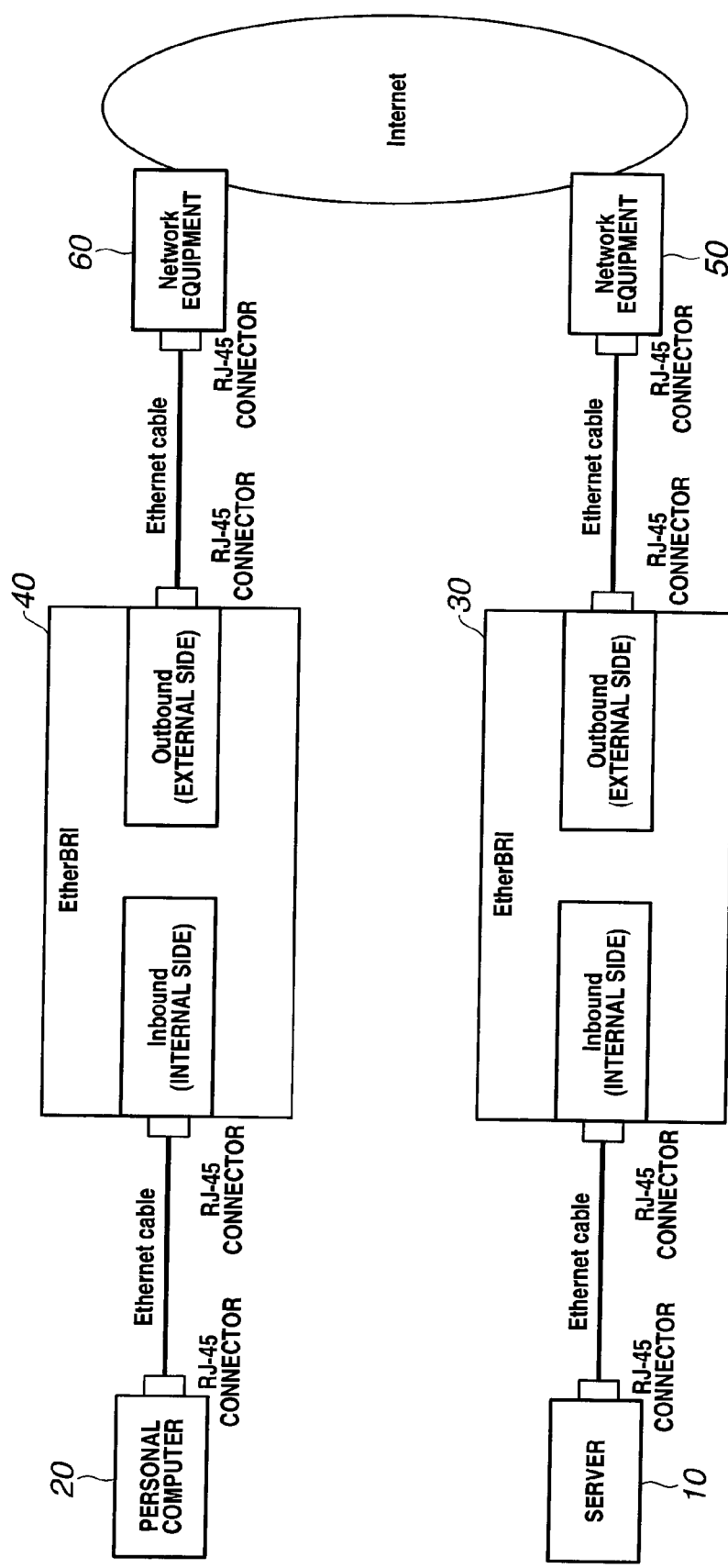
FIG. 1 shows a system configuration view representing a first preferred embodiment according to the present invention.

FIG. 1 shows a system configuration view representing a first preferred embodiment. In a system which performs an encryption communication between a server 10 and a personal computer (client) 20 via an internet, the server and the client are connected via bridges (EtherBRI) 30, 40 in which Ethernet communication ports are equipped in two channels as LAN communication means, respectively.

Network equipments 50, 60 are connected to bridges 30, 40 in which personal computer (client) 20 and server 10 are Ethernet connected to Inbound (internal side) of the two communication ports and the internet side is connected to outbound (external side).

Figure 2:
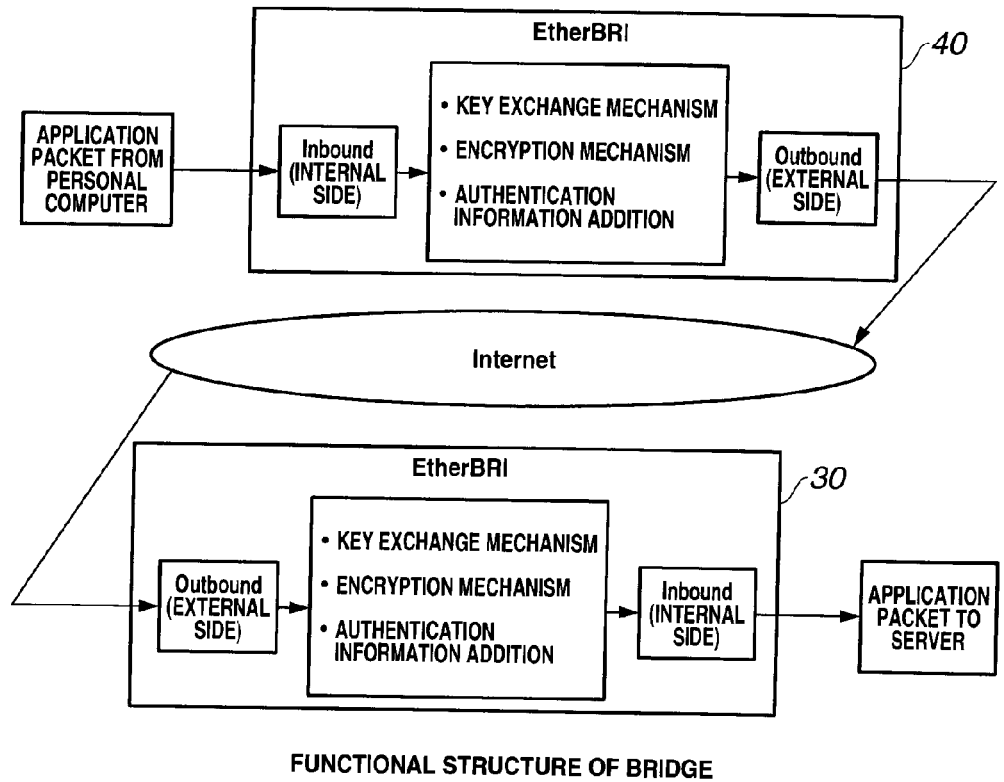
FIG. 2 shows a relationship diagram between functions of a bridge.
Figure 3:
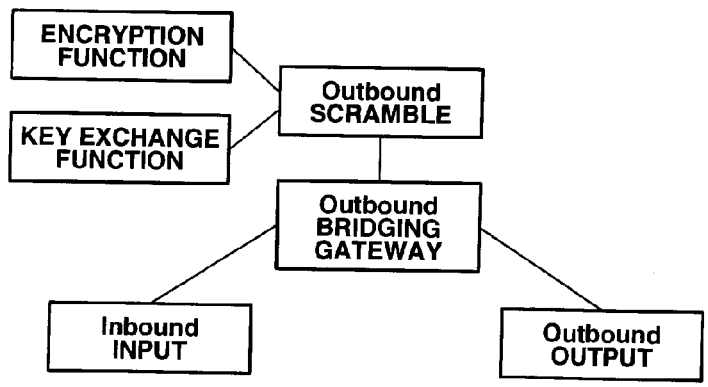
FIG. 3 shows a relationship diagram between functions of a bridge.

FIG. 2 shows function configuration views of bridges 30, 40 and these respective bridges have a packet scramble function, a scramble purpose encryption key management function, and a bridging system authentication function according to a key exchange mechanism, an encryption mechanism, and an authentication information addition.

A relationship between these functions is such that an application packet from personal computer 20 is inputted from Inbound of bridge 40 and encrypted in the internal of bridge 40 and the encrypted packet is outputted to the internet from Outbound via network equipment 60. Encryption communication addressed bridge 30 decodes the encrypted packet inputted via the internet and performs a bridging to server 10.

A mutual behavior between bridges 30, 40 is such that, when a communication packet is transmitted from a transmission source to a recipient, these bridges perform the authentication of the packet from the corresponding bridge 30 or 40 and perform the key exchange for the encryption. After the key exchange, the encrypted packet can mutually be transmitted or received.

Second Embodiment

Figure 4:
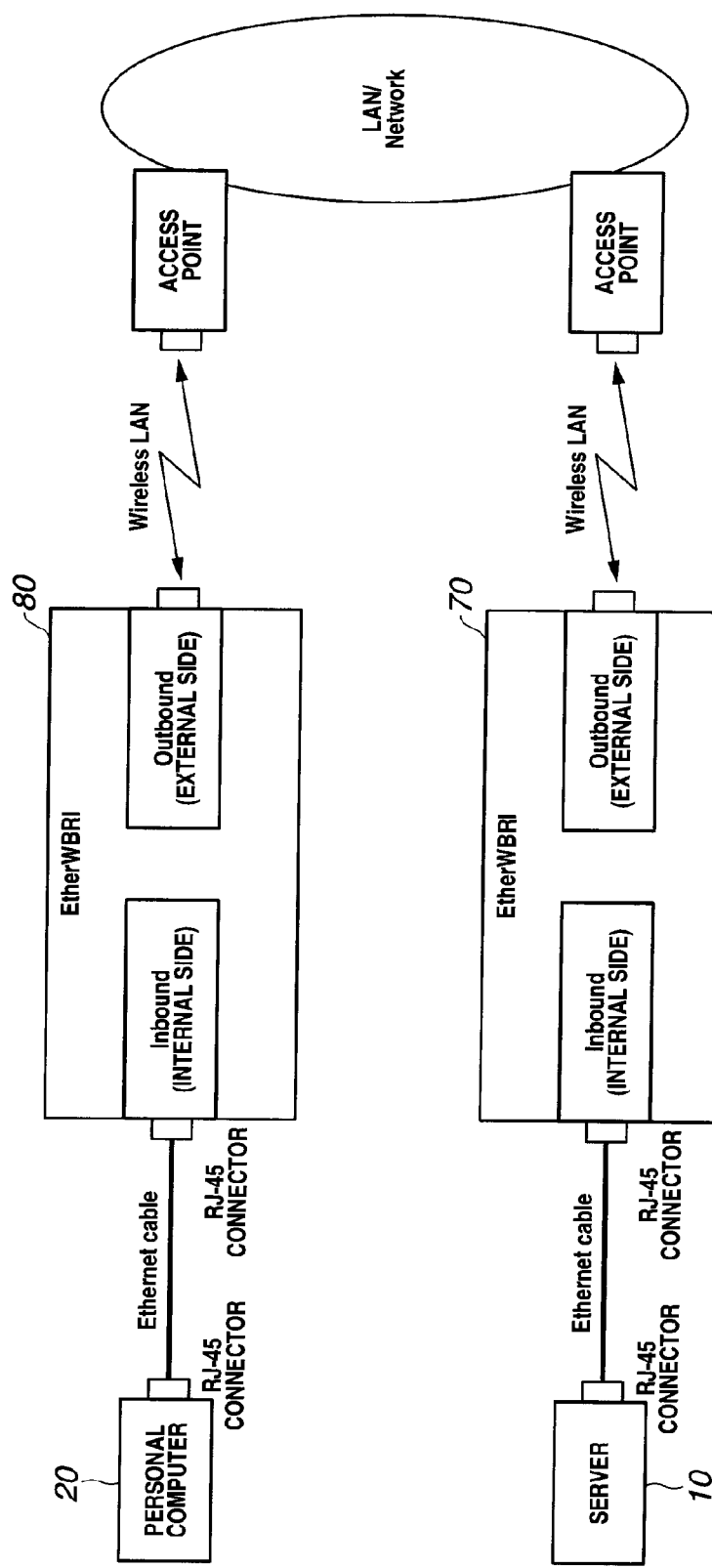
FIG. 4 shows a system configuration view representing a second preferred embodiment according to the present invention.

FIG. 4 shows a system configuration view representing a second preferred embodiment according to the present invention. FIG. 4 shows a case where the Ethernet is bridged to a wireless LAN. In this system configuration, wireless bridges (EtherWBRI) 70, 80 are adopted in place of bridges 30, 40.

A single Wireless LAN port is provided on each of wireless bridges 70, 80. The personal computer and/or the client is connected to Inbound (internal side). Outbound (external side) is connected to an access point wirelessly.

Figure 5:
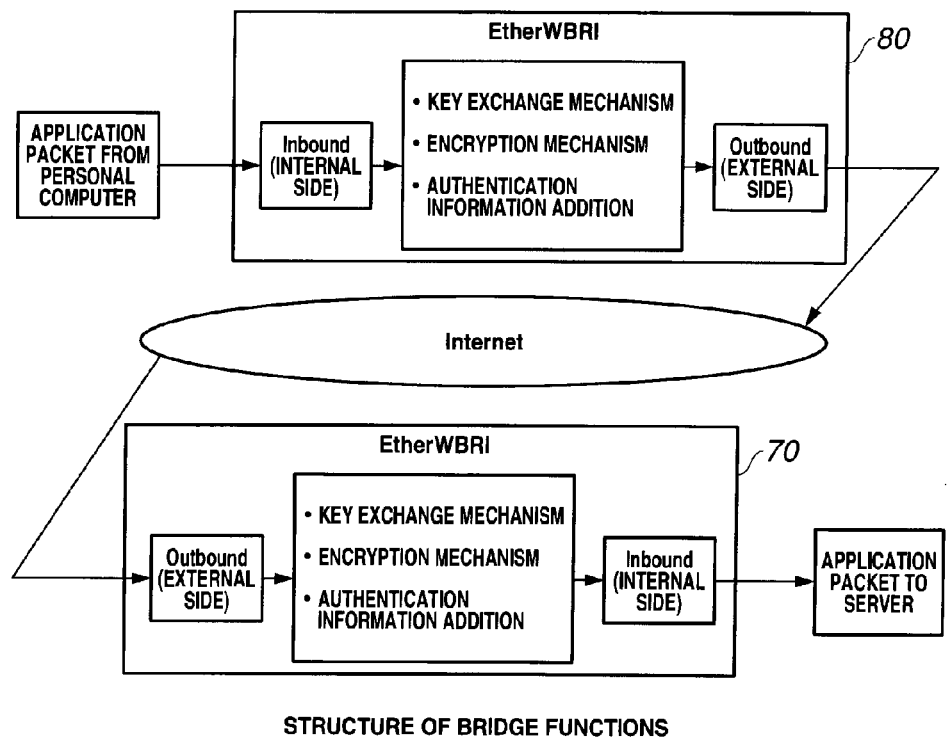
FIG. 5 shows a configuration view of a function of the bridge.

FIG. 5 shows a functional structure of the bridges of each of wireless bridges 70, 80. Each of wireless bridges 70, 80 is provided with the packet scramble function, the scramble purpose encryption key management function, and the bridging system authentication function by means of the key exchange mechanism, the encryption function, and the authentication information addition.

According to these functional structures, the application packet from personal computer 20 enters Inbound of one of wireless bridges 70 and is encrypted in the internal of corresponding bridge 70. The encrypted packet is outputted via Outbound. Communication partner wireless bridge 80 deciphers the inputted data from the internet and bridges to server 10.

Figure 6:
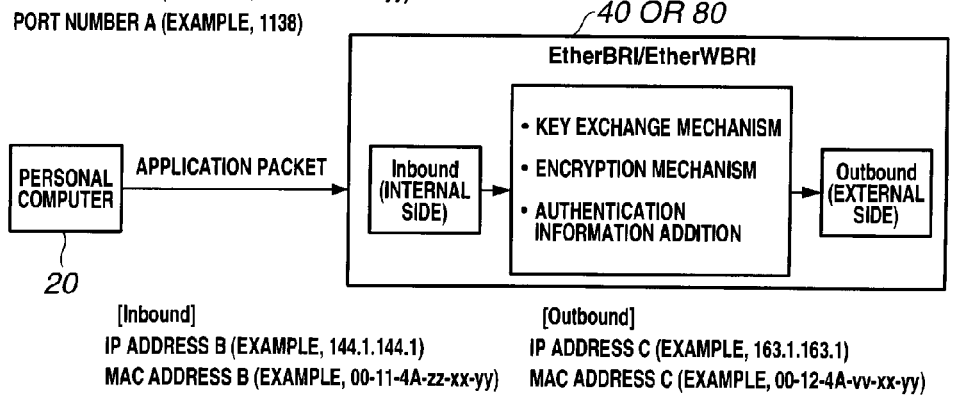
FIG. 6 shows a specific example of a scramble & bridge gateway function.

A mutual behavior of each of wireless bridges 70, 80 is such that the authentication is made that it is the packet from the corresponding wireless bridge when the communication packet is derived from the transmission source to the recipient and performs the key exchange for the encryption. After the key exchange, the encrypted packet is enabled to be mutually transmitted and received, Specific Example FIG. 6 shows a specific example of a scramble & bridge gateway function by means of bridge 40 (or wireless bridge 80). Inbound of bridge 40 and personal computer 20 and Outbound thereof are states as shown in Table 1 when addresses are those naturally have and as shown in Table 2 when these are logically bridged.

That is to say, bridge 40 handles as if the packet that were outputted by personal computer 20. In other words, the IP address thereof, the MAC address, and the port number are modified to these addresses of personal computer 20 and numbers thereof. Since IP address is logically non-state, an add-on becomes possible without a set modification of the network.

Table 3 described below shows a date structure of Ethernet frame outputted between the personal computer and Inbound. Table 4 described below shows a date structure of Ethernet frame outputted from Outbound.

In Table 4, the encryption is applied to only an area of Data as their states when the Ethernet frame passes through bridge 40 and an authentication ID is added to Date Encrypt which is the packet from the bridge.

The following effects are achieved according to the bridging system (bridge) shown in the above-described first and second embodiments.

(a) The encryption and authentication are made possible without alternation of software. That is to say, the scramble & bridging gateway function is operated in the bridge or a wireless bridge according to the receipt of the communication packet from the personal computer and from the server so that a data payload region can automatically ciphered. In addition, an authentication ID is inserted which is the packet from the bridge or the wireless bridge. Thus, an independent authentication becomes possible.

(b) No server for the authentication is needed. That is to say, the end-end authentication by means of the bridge or the wireless bridge is resulted without necessity of an SSL server or a certification authority (CA).

(c) An easy add-on is possible to the internet due to impendency of IP address. That is to say, since, in the scramble & bridging gateway function, the network address at the computer side is directly forwarded, no problem of NAT (network address translator) such as in IPSec (IP Security protocol) (the communication cannot be made in the network constituted by NAT) occurs.

(d) An encryption infrastructure can be achieved. That is to say, the communication infrastructure of the encryption authentication according to the present invention can provide a safety community. In a case where the information is protected, no communication is possible if no bridge nor no wireless bridge is present. Hence, a risk of a leakage can be eliminated.

(e) A wireless security can be strengthened. That is to say, the wireless is of a broad band type and the communication can be captured. However, in the case of the present invention, either or both of the bridge and the wireless bridge are encrypted and communicated and the mutual authentication is possible. Hence, in a case where either the bridge or the wireless bridge is not present, the capturing becomes impossible and a communication safety can be increased.

Third Embodiment

Figure 7:
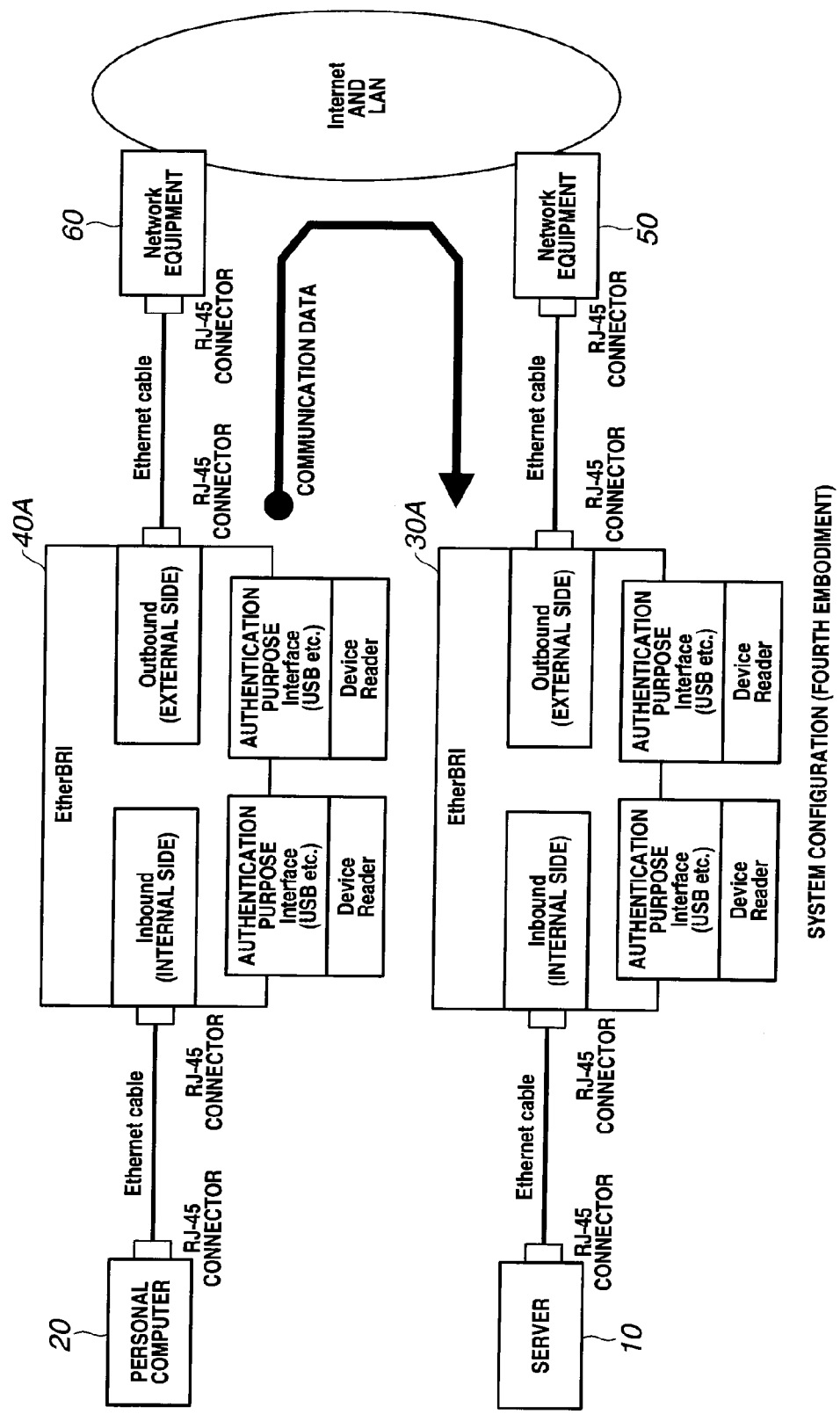
FIG. 7 shows a system configuration view representing a third preferred embodiment according to the present invention.

FIG. 7 shows a system configuration view representing a third preferred embodiment according to the present invention. Different portions of the system configuration in FIG. 7 from that in FIG. 1 is that bridges 30A, 40A are provided in place of bridges 30, 40. Bridges 30A, 40A are different from those of 30, 40 in that a composite authentication function is added by actually mounting a plurality of authentication purpose interface (USB and so forth) thereon.

Figure 8:
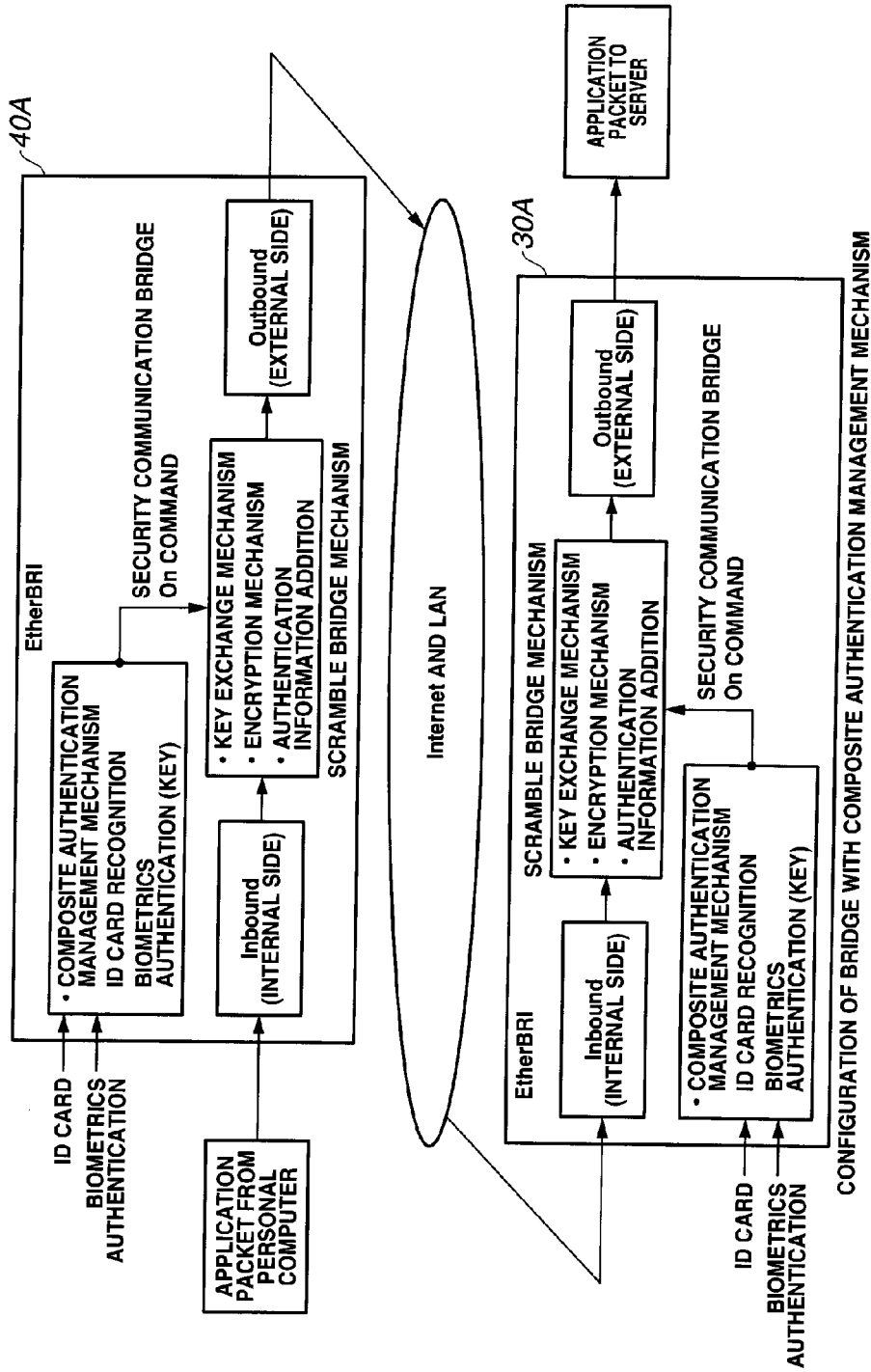
FIG. 8 shows a configuration view of a composite authentication management mechanism equipped bridge.

The functional structure of each of bridges 30A, 40A is such that, for example, as shown by the structure of the composite authentication management mechanism equipped bridge in FIG. 8, an individual authentication purpose device and organism authentication purpose device in an authentication purpose interface (USB and so forth) read recognition and authentication purpose data via a Device Reader and the individual authentication purpose device manages uniquely using a system ID. For the individual authentication, IC card or contact/non-contact ID card is used. In addition, the organism authentication purpose device is used for the recognition of the individual person and generates organism data such as a fingerprint, a voiceprint, an iris, a vein, and so forth.

Figure 9:
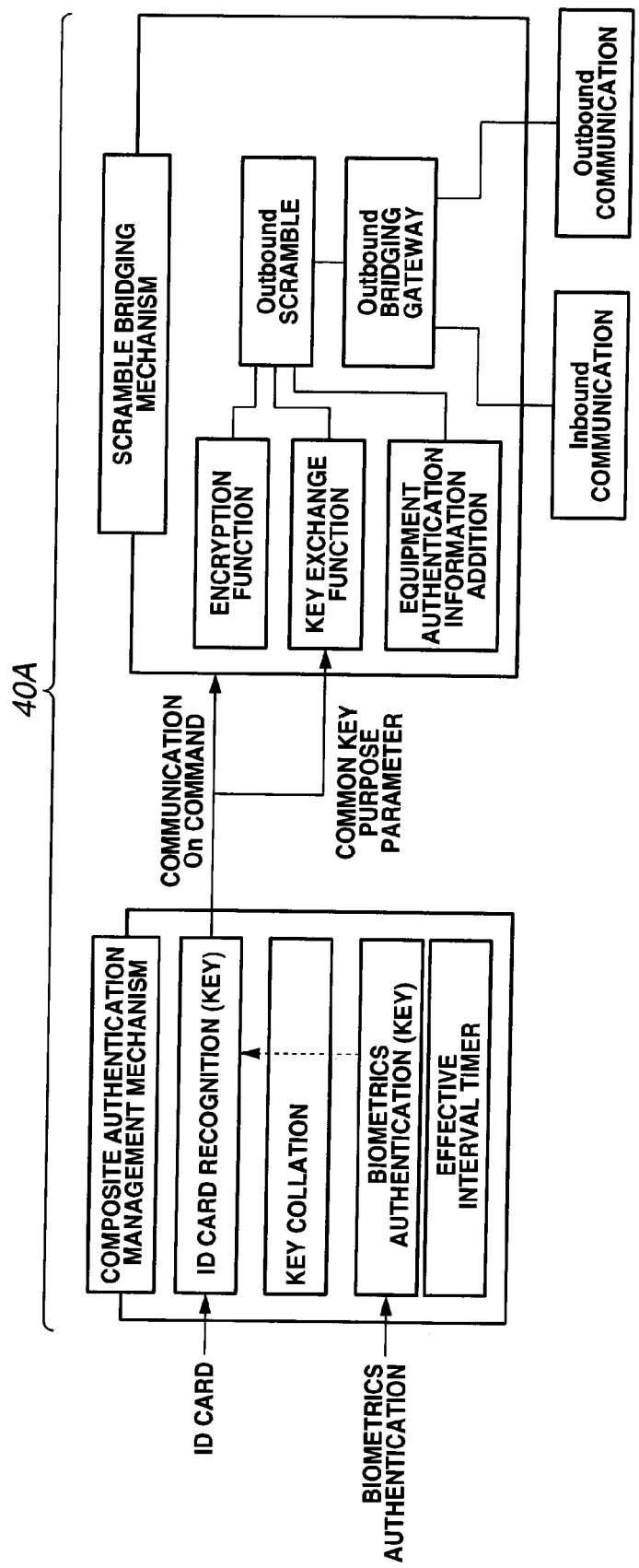
FIG. 9 shows a relationship view among functions of the composite authentication management mechanism.

This composite authentication management mechanism is primarily authenticated at the individual authentication purpose device and finally authenticated at the organism authentication purpose device to achieve an individual identification. The authentication through this composite authentication management mechanism is executed in the following sequence according to the structure shown in FIG. 9.

(Sequence 0): The scramble bridging mechanism of bridge 40A is in a network disconnection state in which its communication function is stopped in a case where the authentication is not succeeded.

(Sequence 1): The composite authentication management mechanism obtains the user key when the system purpose ID card is inserted therein and the organism user key has been registered in the ID card.

(Sequence 2): The composite authentication management mechanism performs the organism authentication from the fingerprint data of the user obtained by the organism authentication purpose device after the individual recognition.

(Sequence 3): The user key is collated to the user key within the ID card after the individual recognition. If authenticated, an ON command is issued in the scramble bridge mechanism.

(Sequence 4): The scramble bridge mechanism is authenticated by a mutual bridge opposing against a parameter, performs an automatic key exchange, and determines a common key.

(Sequence 5): The common key is used to encrypt the communication and decipher the encrypted communication.

(Sequence 6): The application packet from the personal computer enters through Inbound and is encrypted within the internal of the bridge.

(Sequence 7): The encrypted packet is transmitted through Outbound.

(Sequence 8): The communication partner bridge deciphers the packet from the internet and bridges the server.

Fourth Embodiment

Figure 10:
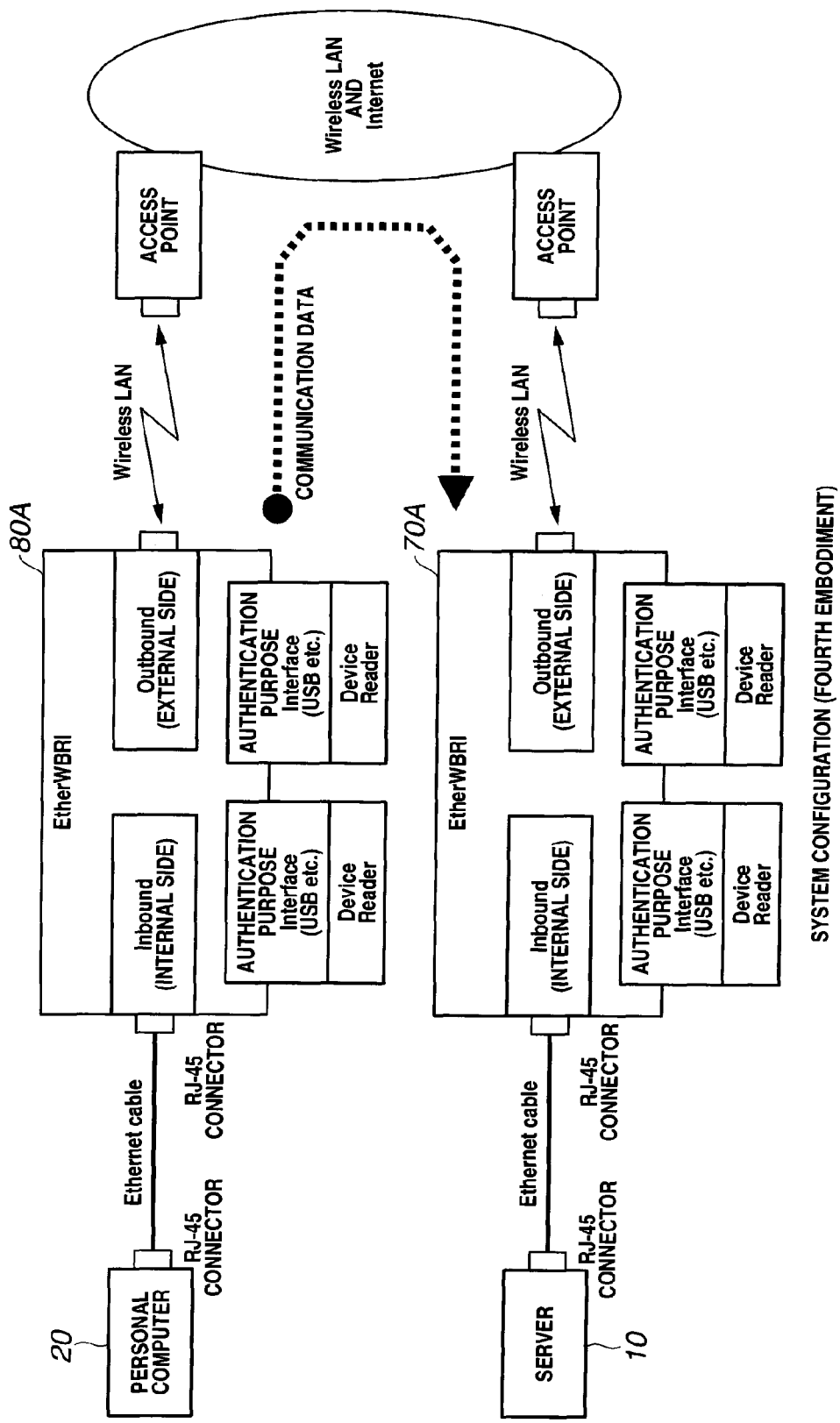
FIG. 10 shows a system configuration view representing a fourth preferred embodiment according to the present invention.

FIG. 10 shows a system configuration view representing a fourth preferred embodiment according to the present invention. FIG. 10 is a case where the Ethernet is bridged to Wireless LAN. In this system configuration, wireless Bridges (EtherWBRI) 70A, 80A are provided in place of bridges 30A, 40A.

Wireless bridges 70A, 80A have one LAN port and one Wireless LAN port, the personal computer and the client being connected to Inbound (internal side) and the access point being connected to Outbound (external side) wirelessly.

Figure 11:
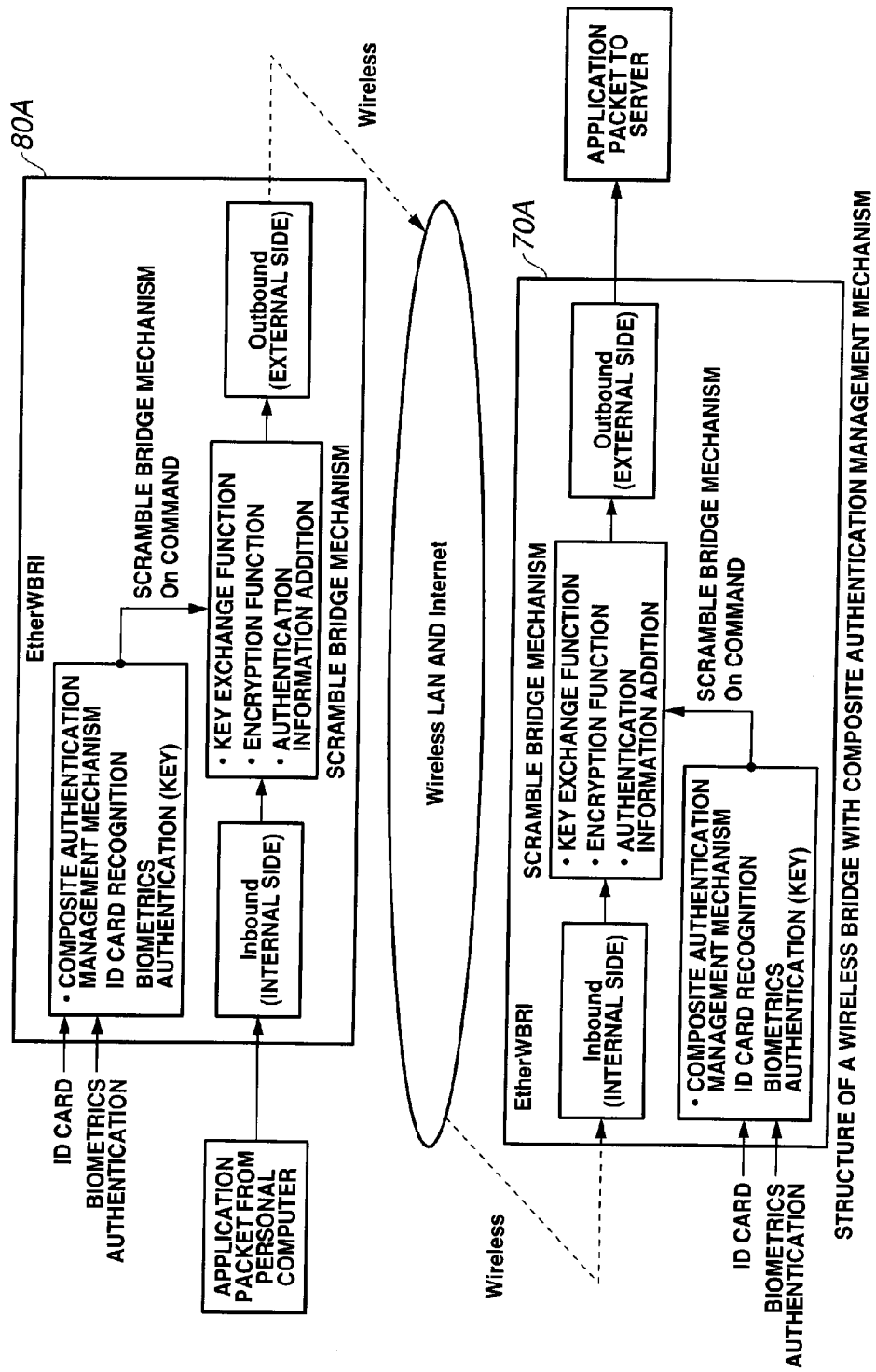
FIG. 11 shows a configuration view of a wireless bridge equipped with a composite authentication management mechanism.

FIG. 11 shows a functional structure of wireless bridges 70A, 80A. Each of these wireless bridges has a packet scramble function, a scramble purpose encryption key management function, and an individual authentication function according to the composite authentication management mechanism, the key exchange mechanism, the encryption mechanism, and the authentication information addition.

In this embodiment, the individual authentication by means of the composite authentication management mechanism is carried out in the same way as the third embodiment. The authentication processing, the key exchange mechanism, and the key automatic exchange between opposing bridges are carried out wirelessly. In addition, the scramble & bridge gateway function through bridge 40A (or wireless bridge 80A) are carried out in the same way as the first and second embodiments.

The following effects are achieved according to the addition of the composite authentication function in the bridging system and the apparatus in each of the above-described third and fourth embodiments.

(a) Even if ID card is lost or stolen, the composite authentication together with the biometrics authentication is carried out. Hence, any other person than its owner of ID card cannot be validated. That is to say, leakage and abuse can be defended.

(b) It is not necessary to remember a personal identification number of ID card, the biometrics authentication is carried out, and the ID card is validated. Hence, a personal authentication is safely possible even in young age and old age layers. In addition, a high convenience can be achieved.

(c) A strong information confidentiality according to the composite authentication can be achieved. In addition, the bridge or the wireless bridge is a bridge type connected to the computer via a network cable. When the communication packet of the computer is received, the scramble & bridging gateway function is operated to encrypt a data payload portion automatically. In addition, an equipment authentication information which is the packet from the bridge or the wireless bridge is inserted into the scramble & bridging gateway function to permit mutually peculiar authentications.

(d) The server for the authentication is not needed and conventional SSL server and authentication authority become unnecessary. An end-to-end authentication by means of the bridge associated with the biometrics or the wireless bridge is performs.

(e) The network reconstruction required for the composite authentication addition becomes minor. That is to say, since the composite authentication is not dependent upon IP address, the easy add-on to the network can be achieved.

(f) It should be noted that, according to the present invention, part or whole processing function of the system and apparatus shown in FIG. 2 or so forth is constituted by a program to permit an execution by the computer.

Fifth Embodiment

Figure 12:
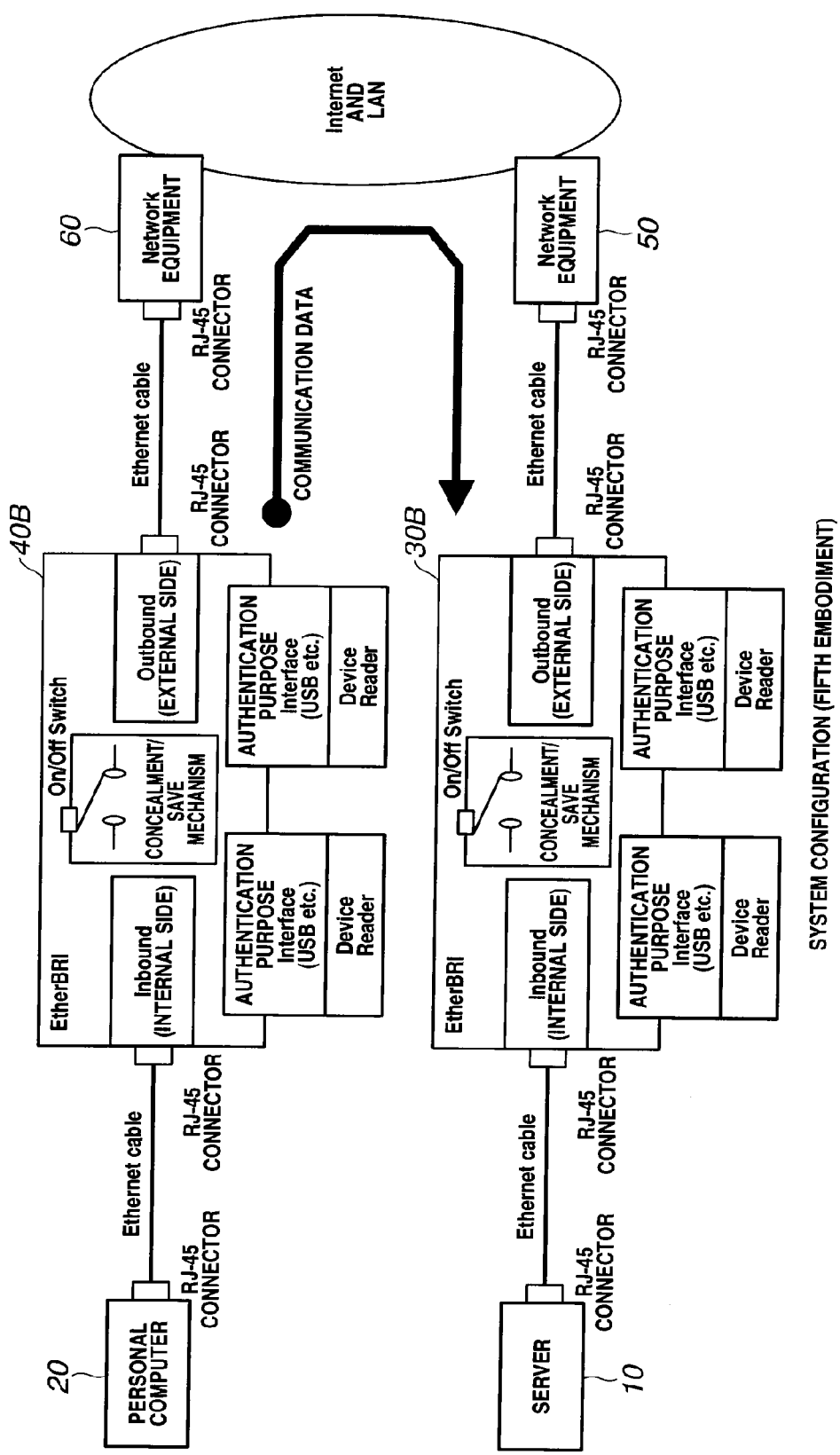
FIG. 12 shows a system configuration view representing a fifth preferred embodiment according to the present invention.

FIG. 12 shows a system configuration view of a fifth preferred embodiment according to the present invention. The difference point of FIG. 12 from FIG. 7 is that, in place opf bridges 30A, 40A, bridges 30B, 40B are adopted.

In each of the third and fourth embodiments, an encryption transmission is performed after the authentication. However, at a time point at which the encryption communication has reached to the terminal at the reception side and to the computer, the text gives a plaintext. In details, a counter-measure of data leakage is systematically not made. Therefore, a safety of data after the authentication is secured by actually mounting a concealment/save mechanism on each of bridges 30A, 40A.

Figure 13:
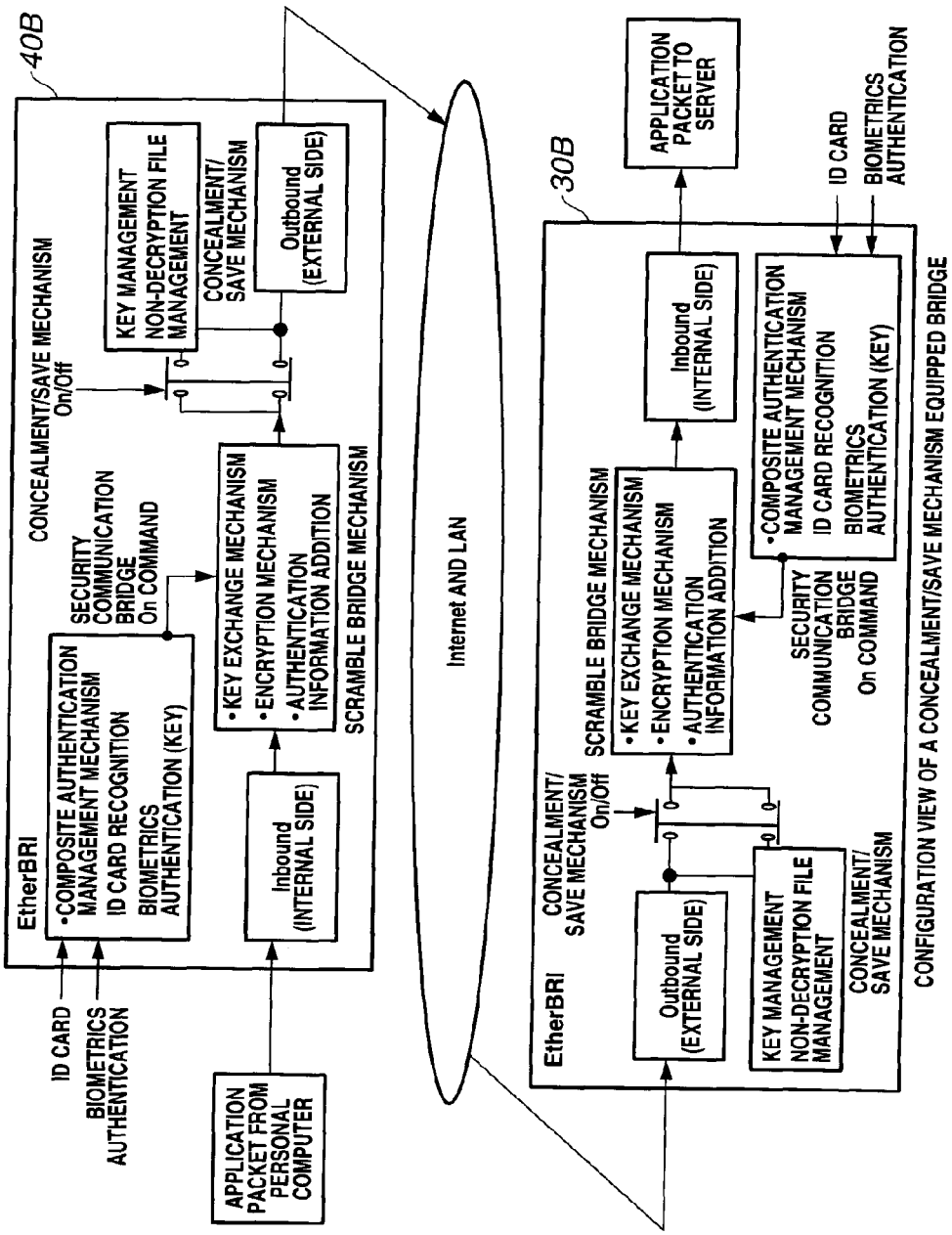
FIG. 13 shows a configuration view of a concealment/save mechanism equipped bridge.

The structure of bridges 30B, 40B represents the composite authentication management mechanism+concealment/save mechanism equipped bridge, for example, in FIG. 13. The concealment/save mechanism permits a change between activation/deactivation according to On/Off change. During On state, the concealment and save of data after authentication is performed according to the key management function and non-decryption file management function.

Figure 14:
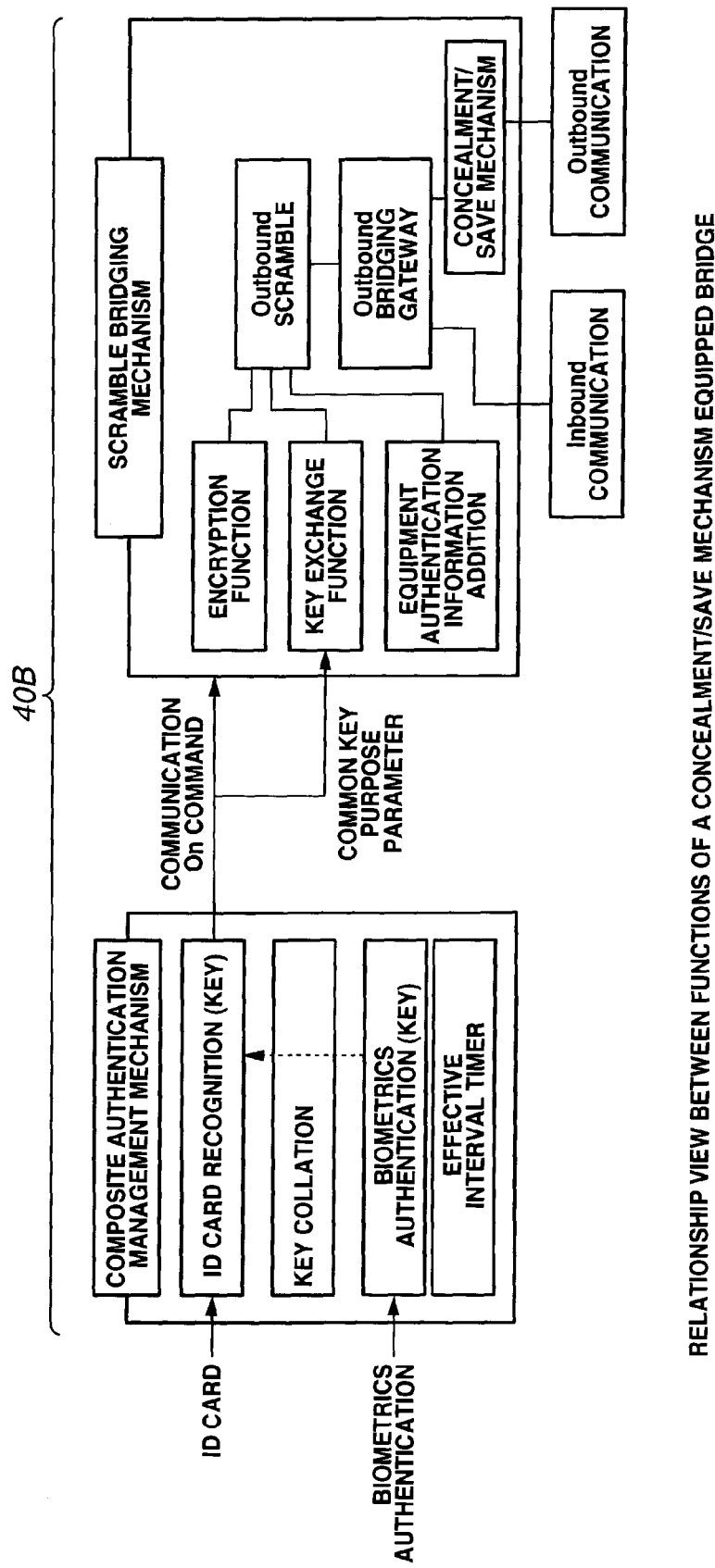
FIG. 14 shows a relationship view between functions of the concealment/save mechanism.
Figure 15:
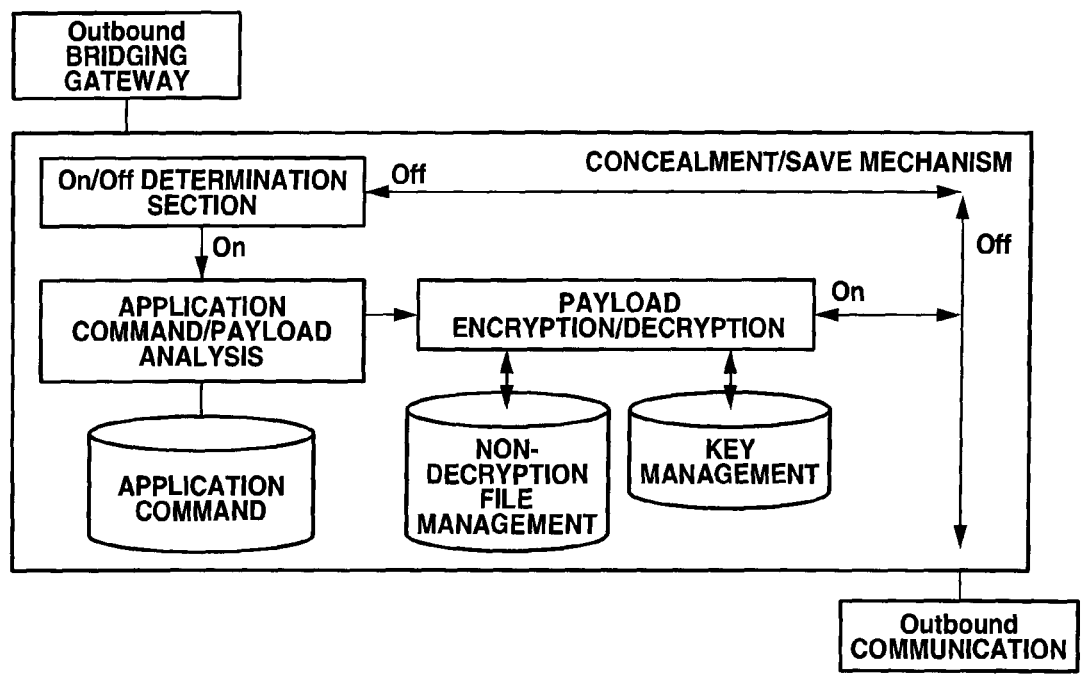
FIG. 15 shows a configuration view of the concealment/save mechanism.

The concealment and saving of data by means of this concealment/save mechanism by means of the relationship view between bridge functions shown in FIG. 14 and the structure of the concealment/save mechanism shown in FIG. 15 are executed in the following sequence.

The concealment and saving of data by means of this concealment/save mechanism will be explained with the communication from the transmission side (application packet from the personal computer shown in FIG. 13 to the reception side (the application packet to the server) shown in FIG. 13.

(Sequence 0):
The scramble bridging mechanism of bridge 40B is in a network disconnection state in which the communication function is stopped in a case where the authentication is not succeeded.

(Sequence 1):
The composite authentication management mechanism obtains a user key when the system purpose ID card is inserted into the system since the user key of the biometrics as authentication.

(Sequence 2):
After the individual recognition, the biometrics authentication is carried out from user's fingerprint data obtained by the biometrics authentication device.

(Sequence 3):
After the biometrics authentication, the user key is collated to the user key within the ID card. After the authentication is carried out, On command for the scramble bridge is issued and is operated.

(Sequence 4):

The transmission side bridge mutually authenticates the user key including the bridge opposing against the parameter and the On/Off state of the concealment/save mechanism when the application packet from the personal computer is inputted through Inbound, performs the automatic key exchange, and the common key. At this time, in a case where the concealment/save mechanism at the transmission side is On, the common key during the communication is managed and held after the communication. This portion provides the key management function of the concealment/save mechanism. It should be noted that the management and holding after the communication are not carried out after the communication in a case where the concealment/save mechanism is in a state of "Off".

(Sequence 5)

The application which communicates with the common key when the concealment/save mechanism is On is determined according to the port number. Furthermore, the communication application command is interpreted in order for a communication application payload (in other words, the application command and other than the file name) to be encrypted in the internal of the transmission side bridge. At this time, the file information such as the file name to be transmitted is managed and held. This portion provides the non-decryption file management function for the concealment/save mechanism. It should be noted that the non-decryption file management function does not manage nor hold after the communication in a case where the concealment/save mechanism is in an Off state.

(Sequence 6):

The packet in which only application payload is encrypted is outputted from Outbound of the transmission side bridge.

(Sequence 7):

The packet in which only the application payload is encrypted is inputted into Outbound of the reception side bridge. Then, the concealment/save mechanism which has already been mutual authentication ended to the opposing transmission side bridge is directly fed to Inbound of the reception side bridge in non-decryption and is bridged to the server.

(Sequence 8): At this time, in the server, with the content of the application payload except the application command and the file name encrypted, the application payload is passed to the application in the server and saved therein. This state is a state in which the concealment and saving are performed. This state corresponds to the concealment and save state.

(Sequence 9): When the personal computer to be connected to the transmission side bridge calls the file in a state in which the concealment and save are performed by the server, the key management and non-decryption file management of the concealment/save mechanism of the transmission side bridge manages the common key at the time of encryption and the file information such as a file name at that time. Thus, the decryption for these pieces of information is carried out.

Hence, the server can save safely in a state in which the file is encrypted. Since, during the leakage, the key is present only at the transmission side bridge, a hacking at the server side becomes impossible.

Sixth Embodiment

Figure 16:
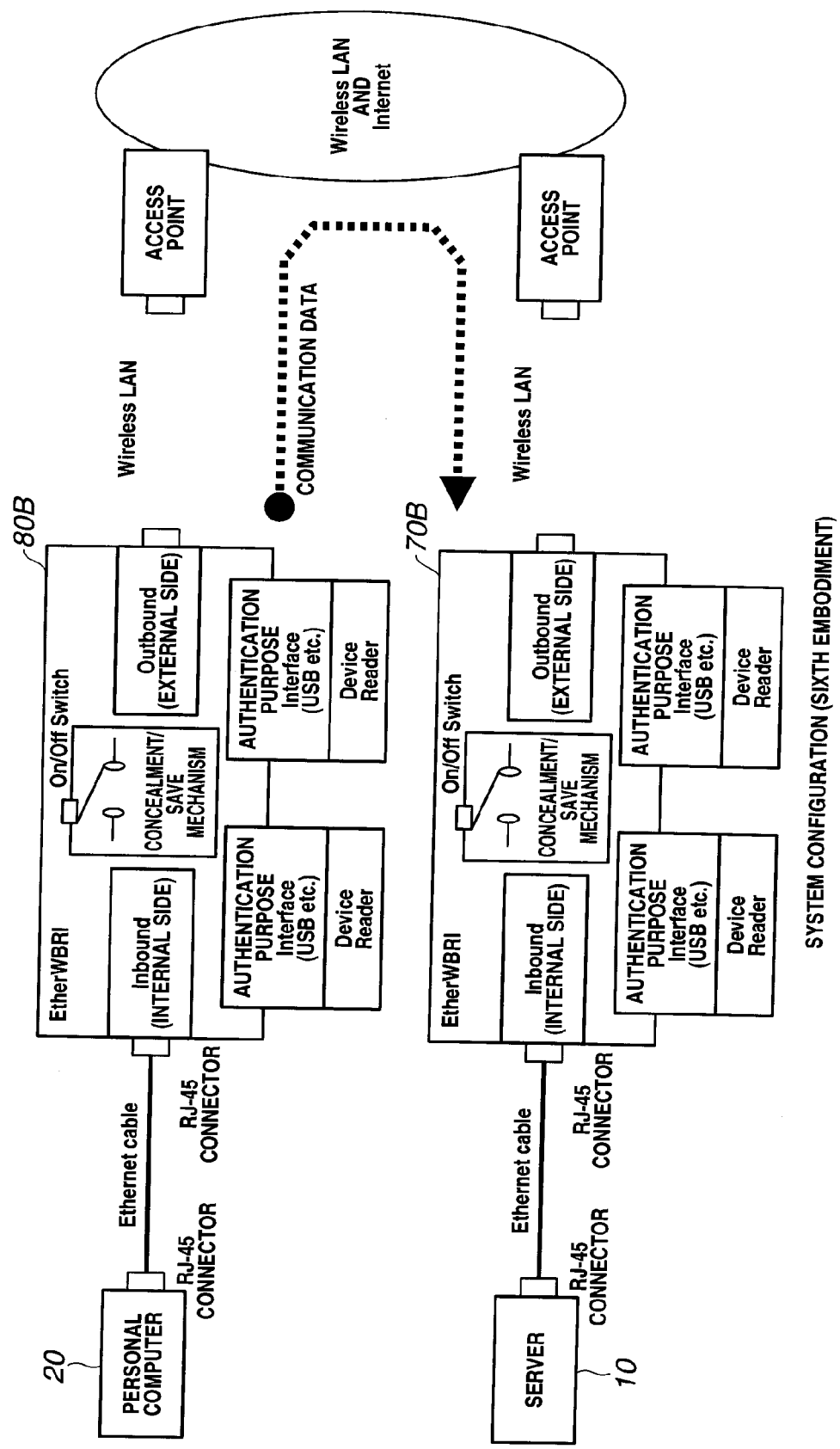
FIG. 16 shows a system configuration view representing a sixth preferred embodiment according to the present invention.

FIG. 16 shows a system configuration view representing a sixth preferred embodiment according to the present invention. The composite authentication management mechanism and the concealment and save mechanism are provided and the Ethernet is bridged via wireless LAN. In this system configuration, wireless bridges (EtherWBRI) 70B, 80B are adopted in place of bridges 30B, 40B.

Each of wireless bridges 70B, 80B is provided with a single LAN port, a single Wireless LAN port, Inbound (internal side) connected to the personal computer or the client, and Outbound (external side) connected to the access point wirelessly.

Figure 17:
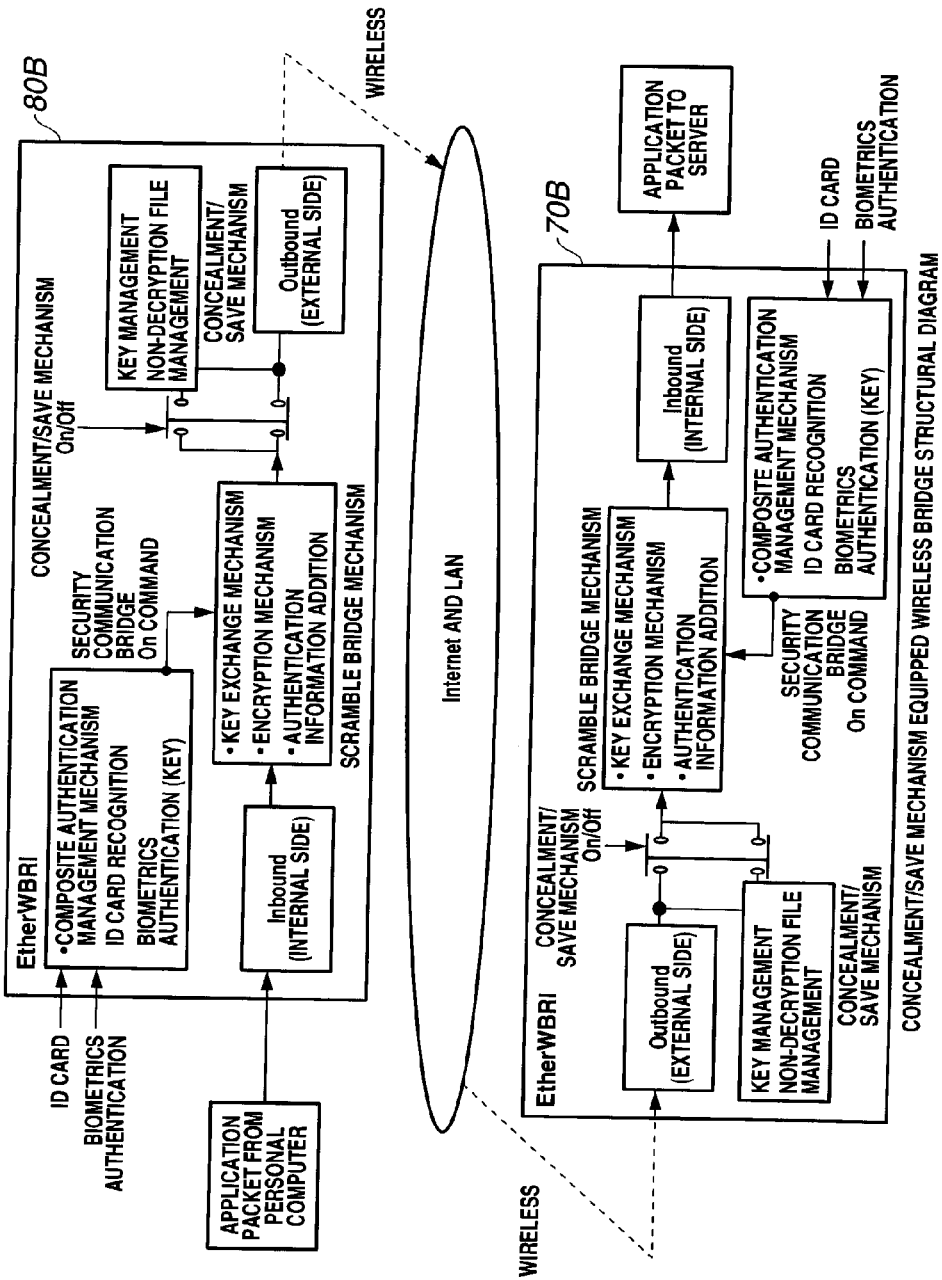
FIG. 17 shows a configuration view representing a concealment/save mechanism equipped wireless bridge.

FIG. 17 shows a function structure of wireless bridges 70B, 80B. According to the composite authentication management mechanism, the key exchange mechanism, the encryption mechanism, the concealment/save mechanism, and authentication information addition, each of wireless bridges is provided with a packet scramble function, a scramble purpose decipher key management function, an individual authentication function, and data concealment and save mechanism.

In this embodiment, the data concealment according to the concealment and save mechanism is carried out in the same way as the fifth embodiment. However, the authentication processing, the key automatic exchange, and so forth are carried out wirelessly. In addition, the scramble & bridge gateway function according to bridge 40B (or wireless bridge 80B) is the same as described in each of the third and fourth embodiments.

Specific Example

Figure 18:
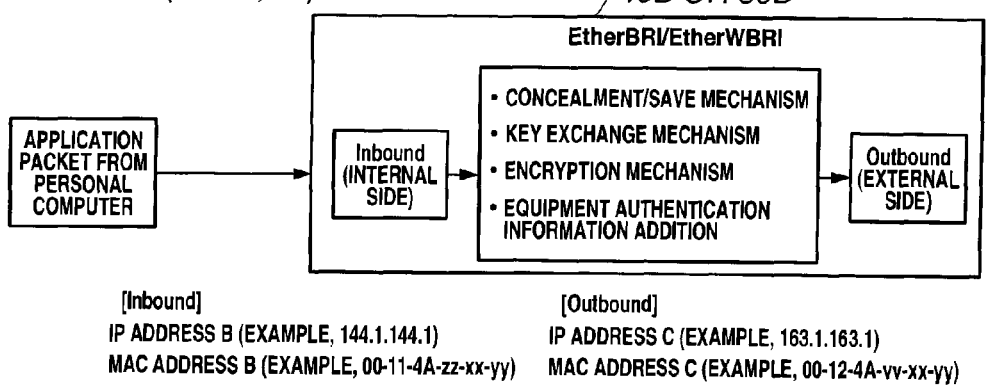
FIG. 18 shows a specific example of the scramble & bridge gateway functions.

FIG. 18 shows a specific example of the scramble & bridge gateway function by means of bridge 40B (or wireless bridge 80B). The scramble & bridge mechanism shown in FIG. 18 is different from FIG. 6 in the mounting of concealment/save mechanism in EtherBRI. Addresses that personal computer 20, Inbound of bridge 40B and Outbound thereof that mutually have are the same as Table 1 and Table 2 described above.

The data structure of Ethernet frame to be inputted and to be outputted between the personal computer and the Inbound and the data structure of Ethernet to be outputted from Outbound are as shown in Tables 3 and 4 described above when the concealment/save mechanism is turned off. In Table 3, data provides a plaintext. In Table 4, the encryption is applied only into the area of Data and an authentication ID which is the packet from the bridge is added to DataEncrypt.

On the other hand, when the concealment/save mechanism is turned ON, the data structures of Ethernet frame outputted from the personal computer and Ethernet frame inputted into Inbound are as shown in Table 5. The data structure of Ethernet frame outputted from Outbound is as shown in Table 6.

These tables indicate that the encryption is applied over an area of "application payload" for the data when the data passes through bridge 40B (or wireless bridge 80B). The equipment authentication ID which is the packet from bridge 40B (or wireless bridge 80B) is added.

According to the bridging system described in each of the above-described fifth and sixth preferred embodiments, the following advantages are achieved by the addition of the concealment/save mechanism.

(a) Since the non-decryption data (the encrypted data) is saved into the server and the key of decryption is concealed by the transmission side bridge. Hence, an arbitrary decryption in the internal of the server side cannot be made without permission and at safety.

(b) The modification and rebuilding of application is not necessary at all. That is to say, another than the application command is encrypted and the file information secures the file name at the application command/payload analysis. Hence, it is not necessary to modify and remodel an already available application environment.

(c) It becomes possible to add the service for the concealment and saving in an insignificant network rebuild. That is to say, since not dependent upon the IP address, an easy add-on to the network can be achieved. The scramble-and-bridging gateway function directly forwards the network address at the computer side. Hence, a NAT problem such as IPSec (a network constituted by a NAT structure cannot be communicated).

(d) A safety due to the composite type authentication and the achievement of the information concealment within the server can provide for a data protection infrastructure. That is to say, the decipher decryption authentication and the communication infrastructure of the concealment and save can achieve a safe community. If the information that the individual processes is desired to be protected, the communication is impossible without the bridge. Hence, a risk of leakage can be eliminated.

(e) The security of the wireless communication can be strengthened according to the composite authentication. The wireless communication is a broadcasting type which can capture the communication. However, in this method according to the present invention, the bridge or the wireless bridge can perform the decipher communication so that the mutual authentication and the protection of the date concealment are carried out so that the safety of the wireless communication can remarkably be increased.

This application is based on prior Japanese Patent Applications No. 2008-128979 filed in Japan on May 16, 2008 and No. 2007-289107 filed in Japan on Nov. 7, 2007. The entire contents of these Japanese Patent Applications No. 2008-128979 and No. 2007-289107 are hereby incorporated by reference. Although the invention has been described above by reference to the certain embodiment of the invention, the present invention is not limited to the embodiment described above. Modifications and variations of the embodiment described above will occur to those skilled in the art in light of the above teachings. The scope of the invention is defined with reference to the following claims.

TABLE 1

PHYSICAL ORIGINAL STATUS (ADDRESSES THAT INHERENTLY HAVE)

|  | PERSONAL COMPUTER | Inbound | Outbound |
| --- | --- | --- | --- |
| IP ADDRESS | A (EXAMPLE, 10.1.10.1) | B (EXAMPLE, 144.1.144.1) | C (EXAMPLE, 163.1.163.1) |
| MAC ADDRESS | AA (EXAMPLE, 00-01-4A-00-xx-yy) | BB (EXAMPLE, 00-11-4A-zz-xx-yy) | CC (EXAMPLE, 00-12-4A-vv-xx-yy) |
| PORT NUMBER | AAA (EXAMPLE, 1138) | — | — |

TABLE 2

LOGICALLY BRIDGING STATUS (ADDRESSES THAT LOGICALLY BRIDGE)

|  | PERSONAL COMPUTER | Inbound | Outbound |
| --- | --- | --- | --- |
| IP ADDRESS | A (EXAMPLE, 10.1.10.1) | B (EXAMPLE, 144.1.144.1) | A (EXAMPLE, 10.1.10.1) |
| MAC ADDRESS | AA (EXAMPLE, 00-01-4A-00-xx-yy) | BB (EXAMPLE, 00-11-4A-zz-xx-yy) | AA (EXAMPLE, 00-01-4A-00-xx-yy) |
| PORT NUMBER | AAA (EXAMPLE, 1138) | — | AAA (EXAMPLE, 1138) |

TABLE 3

Ethernet FRAME OUTPUTTED FROM PERSONAL COMPUTER AND Ethernet FRAME INPUTTED TO Inbound

| DESTINATION MAC ADDRESS | MAC ADDRESS A | PROTOCOL TYPE | DESTINATION IP ADDRESS | IP ADDRESS A | DESTINATION PORT NUMBER | PORT NUMBER A | Data (PLAINTEXT) | CRC |
| --- | --- | --- | --- | --- | --- | --- | --- | --- |

TABLE 4

Ethernet FRAME OUTPUTTED FROM Outbound

| DESTINATION MAC ADDRESS | MAC ADDRESS A (NATURALLY C IS CHANGED TO A) | PROTOCOL TYPE | DESTINATION IP ADDRESS | IP ADDRESS A (C IS CHANGED TO A) | DESTINATION PORT NUMBER | PORT NUMBER A (C IS CHANGED TO A) | Data Encrypt ENCRYPTION PROCESS | CRC |
| --- | --- | --- | --- | --- | --- | --- | --- | --- |

TABLE 5

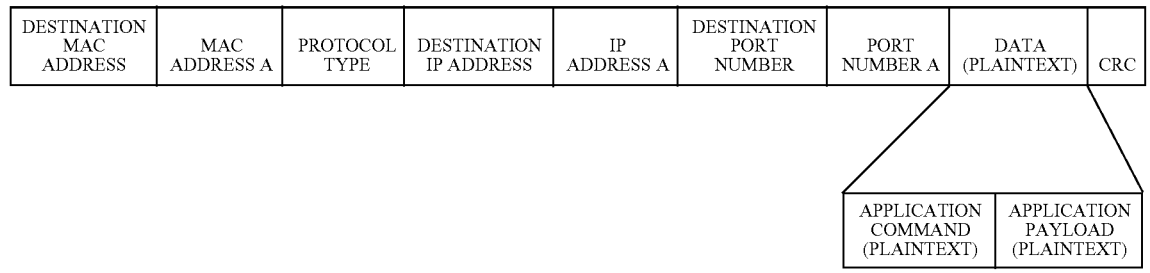

TABLE 6

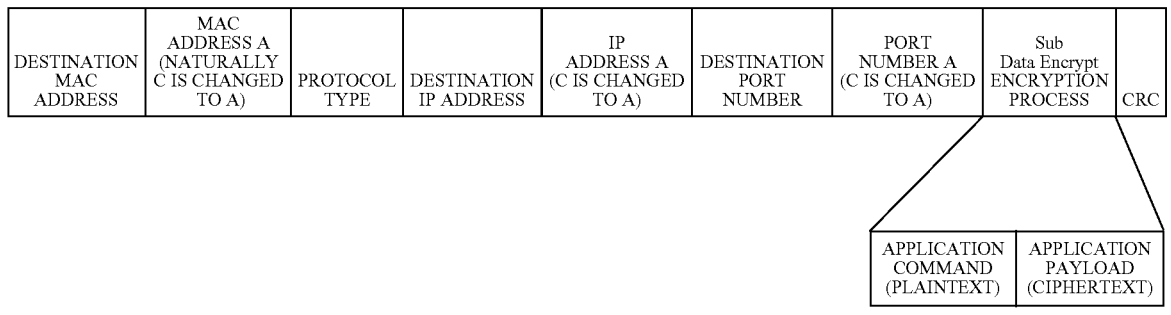

What is claimed is:

1. A hardware bridge for performing a bridging to perform an encryption communication between a server and a client via a LAN (local area network), the hardware bridge comprising:
two channels, one of the channels making a LAN connection to either the server or the client and an other channel making a LAN connection to an internet; and
a processor configured to perform a LAN packet scramble, an encryption key management and a bridging system authentication for a packet from either the sever or the client through a key exchange software mechanism, an encryption software mechanism, and an authentication information addition,
wherein the hardware bridge is configured to perform a composite authentication management software mechanism provided with a plurality of authentication purpose interfaces configured to perform a composite authentication,
wherein the hardware bridge is configured to perform:
the composite authentication management software mechanism; and
a concealment/save software mechanism;
the composite authentication management software mechanism being provided with a procedure to perform a mutual authentication including an On/Off state of the concealment/save software mechanism with an opposing hardware bridge, to perform an automatic key management, and to determine a common key, and
wherein the concealment/save software mechanism comprises:
a key management process for managing and holding the common key even after the encryption communication when the concealment/save software mechanism is in an On state and for allowing decryption with the common key only on a sending side and preventing decryption with the common key on a receiving side; and
a non-decryption file management process for managing and holding a file information encrypting and for transmitting a payload of an application communicated with the common key at an internal of a sending side hardware bridge.

2. The bridge as claimed in claim 1, wherein the bridge performs a direct forwarding for a network address at a packet transmission side to a scramble & bridging gateway of the packet.

3. The bridge as claimed in claim 2, wherein the bridge performs the direct forwarding of a network address for a sender MAC address of the packet transmission side, which is one of the server and the client, to the scramble & bridging gateway.

4. The bridge as claimed in claim 1, wherein the composite authentication management software mechanism recognizes an individual authentication purpose device and a biometrics authentication purpose device via a device reader and reads an authentication purpose data, wherein the individual authentication purpose device performs a unique management using a system ID.

5. A bridging method for performing an encryption communication between a server and a client via a LAN (local area network), the bridging method comprising:
connecting an internet via a hardware bridge in which two channels are equipped, one of the two channels making a LAN connection to either the server or the client and an other channel making a LAN connection to the internet, wherein the hardware bridge is provided with a procedure to perform a LAN packet scramble, a scramble purpose encryption key management, and a bridging system authentication for a packet from either the server or the client, wherein the hardware bridge is provided with a composite authentication management software mechanism provided with a plurality of authentication interfaces configured to perform a composite authentication and a concealment/save software mechanism, the composite authentication management software mechanism provided with a composite authentication management procedure to perform a mutual authentication including an On/Off state of the concealment/save software mechanism with an opposing hardware bridge, to perform an automatic key exchange, and to determine a common key, and the concealment/save software mechanism being provided with a key management procedure to manage and hold the common key even after the encryption communication when the concealment/save software mechanism is in an On state and for allowing decryption with the common key only on a sending side and preventing decryption with the common key on a receiving side, and a non-decryption file management procedure to manage and hold a file information encrypting and to transmit a payload of an application communicated with the common key at an internal of a sending side hardware bridge.

6. The bridging method as claimed in claim 5, wherein the bridge is either a wire connection bridge configured to perform the encryption communication with the internet via a wire connection network equipment or a wireless connection bridge configured to perform the encryption communication with an access point at the internet wirelessly.

7. The bridging method as claimed in claim 5, wherein the hardware bridge is provided with a procedure to perform a direct forwarding for a network address at a packet transmission side to a scramble & bridging gateway.

8. The bridging method as claimed in claim 7, wherein the composite authentication management procedure recognizes an individual authentication purpose device and a biometrics authentication purpose device via a device reader and reads authentication purpose data, wherein the individual authentication purpose device is provided with a procedure for performing a unique management using a system ID.

9. The bridging method as claimed in claim 7, wherein the hardware bridge is provided with the procedure to perform the direct forwarding of a network address for a sender MAC address of the packet transmission side, which is one of the server and the client, to the scramble & bridging gateway.

10. A bridging system for performing an encryption communication between a server and a client via a LAN (local area network), comprising:

a server's side hardware bridge comprising:
an inbound channel configured to make a LAN connection to the server,
an outbound channel configured to make a LAN connection to an internet, and
a processor configured to perform a LAN packet scramble and a scramble purpose encryption key management for a packet from the server through a key exchange software mechanism, an encryption software mechanism, and an authentication information addition; and
a client's side hardware bridge comprising:
an inbound channel configured to make a LAN connection to the client,
an outbound channel configured to make a LAN connection to the internet, and
a processor configured to perform a LAN packet scramble and the scramble purpose encryption key management for a packet from the client through a key exchange software mechanism, an encryption software mechanism, and an authentication information addition;
wherein the processor of each of the client's side hardware bridge and the server's side hardware bridge is configured to perform:
an authentication management software mechanism configured to perform a mutual authentication with an opposing hardware bridge, to perform an automatic key exchange, and to determine a common key, and
a concealment/save software mechanism comprising:
a non-decryption file management process for encrypting a payload of an application packet with the common key on a sending side, holding a remaining part of the application packet unencrypted, and sending the application packet including an encrypted payload and an unencrypted part, to the hardware bridge on a receiving side to save the encrypted payload on the receiving side in a concealed state to prevent decryption of the payload on the receiving side and to save the payload without decrypting on the receiving side,
a key management process for saving the common key only on the sending side after a session of the encryption communication when the concealment/save software mechanism on the sending side is in an ON state in the session and for enabling decryption of the encrypted payload left encrypted on the receiving side, with the common key saved only on the sending side.

11. The bridging system as claimed in claim 10, wherein at least one of the server's side hardware bridge and the client's side hardware bridge is configured to receive, from a host which is one of the sever and the client, an outgoing packet including a destination MAC address, a sender MAC address and a data portion, and to deliver the outgoing packet with the destination MAC address which is held unmodified and the sender MAC address which is modified to set the sender MAC address to a MAC address of the host.

12. The bridging system as claimed in claim 10, wherein the client intrinsically has a client's network address, the server intrinsically has a server's network address, the inbound channel of the client's side hardware bridge intrinsically has an inbound side network address, the outbound channel of the client's side hardware bridge intrinsically has an outbound side network address, and wherein at least one of the server's side hardware bridge and the client's side hardware bridge is configured to receive, with the inbound channel, from a host which is one of the server or the client, an outgoing packet including a destination address, a sender address which is set at a network address of the host, and a data or payload portion and to deliver, from the outbound channel, the outgoing packet with the destination address remaining unmodified and the sender address which is modified to the network address of the host, from the outbound side network address of the outbound channel of the client's side hardware bridge.

13. A bridging method for performing an encryption communication between a server and a client via a LAN (local area network), the bridging method comprising:
a step of receiving, with a hardware bridge on a sending side, from a host which is one of the server and the client, an application packet including an application command and an application payload;

a step of performing an automatic key exchange with a hardware bridge on a receiving side, and determining a common key;

a step of encrypting the application payload of the application packet with the common key in the hardware bridge on the sending side;

a step of sending the application packet including the application command remaining unencrypted and the application payload encrypted, from the hardware bridge on the sending side to the hardware bridge on the receiving side;

a step of receiving the application packet including the application command remaining unencrypted and the application payload encrypted, from the hardware bridge on the sending side, with the hardware bridge on the receiving side;

a step of transferring the application packet including the application command remaining unencrypted and the application payload left encrypted without decrypting the application payload, from the hardware bridge on the receiving side to a host on the receiving side which is the other of the server and the client;

a step of storing the application packet including the application command remaining unencrypted and the application payload left encrypted, in the host on the receiving side; and a step of saving the common key in the hardware bridge on the sending side while the common key is not saved in the hardware bridge on the receiving side and the application payload is left encrypted in the host on the receiving side after a session of the encryption communication.

* * * * *